United States Patent [19]

Shaw

[11] Patent Number: 5,109,569
[45] Date of Patent: May 5, 1992

[54] NON-OSCILLATING CASTER

[75] Inventor: James D. Shaw, Hilton, N.Y.

[73] Assignee: Eastman Kodak Company, Rochester, N.Y.

[21] Appl. No.: 736,367

[22] Filed: Jul. 26, 1991

[51] Int. Cl.$^5$ .............................................. B60B 33/00
[52] U.S. Cl. ...................................................... 16/44
[58] Field of Search .......................................... 16/44

[56] References Cited

U.S. PATENT DOCUMENTS 2,442,831  6/1948  Suttles .
2,738,542  3/1956  Clark .

FOREIGN PATENT DOCUMENTS 2703443  8/1978  Fed. Rep. of Germany ........... 16/44
534585   10/1955  Italy ....................................... 16/44
785295   10/1957  United Kingdom .................... 16/44

Primary Examiner—Robert L. Spruill
Assistant Examiner—Carmine Cuda
Attorney, Agent, or Firm—Dana M. Schmidt

[57] ABSTRACT

A caster is provided that is vertically and rigidly coupled to a heavy instrument via a connecting member surrounded by a resilient damper that will flex under horizontal loading. The caster is improved in that the connecting member connects to a vertical load plate having a horizontal extension that provides a moment arm that exceeds any moment arm of the journal axis of the caster, thereby ensuring that minimum vertical preloading of the damper occurs, reducing the tendency to provide harmonic oscillation under vertical loading.

4 Claims, 2 Drawing Sheets

NON-OSCILLATING CASTER

FIELD OF THE INVENTION

This invention relates to a caster which, although compliant against horizontal loads, resists oscillations under vertical loading.

BACKGROUND OF THE INVENTION

Casters are known in the art for resiliently carrying heavy loads. The problem, however, is that for a caster to have resiliency, e.g., when encountering a horizontal force delivered when the support surface changes abruptly in height, the casters in the past have used energy absorbers which are sensitive to resonances caused by vertical loads. That is, the resiliency of the absorbers applies in the vertical direction as well, so that there are some frequencies under a vertical load that can induce harmonic oscillations. Examples of casters of this construction are shown in U.S. Pat. No. 2,738,542, where the casters are constructed to "give" under a sudden vertical load as well as a sudden horizontal load. Such harmonic oscillations created by vertical loads being "bounced", for example, are unacceptable when the load in question is a fine-tuned instrument. For example, clinical analyzers while transported by truck will not tolerate vertical harmonic oscillations due to bumps in the road.

Resistance to vertical loading is provided by conventional casters in frames having a solid vertical connection to the load itself. However, these are deficient in that they also totally lack resiliency in the horizontal direction, so that horizontal shock is either fully transmitted to the load, or the shock breaks the caster.

The problem has been to provide a caster that will resist oscillations caused by any sudden increases in vertical loading, and still provide resiliency against a sudden increase in horizontal force so as to protect the load from damage.

Although casters of the type shown in U.S. Pat. No. 2,442,831 might seem to provide resistance to vertical loading due to a direct vertical coupling through a stud, while providing a resilient damper to give resiliency under horizontal loading, such casters in fact are not free from susceptibility to vertical oscillations. One reason is that the long moment arm of the caster preloads the damper to the point that it has a significant harmonic resonance to induced vertical oscillations.

SUMMARY OF THE INVENTION

I have designed a caster that meets both requirements noted above, of freedom from resonance under vertical loading and resiliency to horizontal loading.

More specifically, there is provided a caster for a heavy instrument, the caster comprising a frame, means for pivotably connecting the frame to a resilient damper held by the instrument, and journal means for journalling a wheel on the frame off-center from the connecting means, the connecting means comprising a load-bearing plate and a stud fixed to the plate, the plate bearing directly over one of its surfaces onto a surface of the instrument, and the damper being disposed to surround the stud with the plate bearing on the damper, and the frame being fixedly secured to the stud in the vertical direction so as to deliver vertical forces directly onto the load-bearing plate with no vertical displacement of the frame relative to the instrument, the one surface of the plate having a horizontal extension beyond any horizontal moment arm created by the location of the vertical extension of the journal means so that the stud can bend against the damper out of a vertical alignment and the plate can depress a portion of the damper when the wheel encounters only a horizontally-directed force, without preloading said damper with a moment arm exceeding the horizontal extension. Accordingly, it is an advantageous feature of the invention that a caster is provided that is as free of vertically induced harmonic oscillations as it can be while still providing resiliency under horizontal loading.

Other advantageous features will become apparent upon reference to the following Detailed Description, when read in light of the attached drawings.

DESCRIPTION OF THE PREFERRED EMBODIMENTS

The invention is described in connection with the preferred embodiments, wherein the caster is used to render transportable a clinical analyzer as the instrument in question. In addition, the invention is useful in casters for any heavy instrument that can not tolerate either sudden horizontal jarring or vertical harmonic oscillations, for example, other health instruments or even instruments such as concert pianos.

Figure 1:
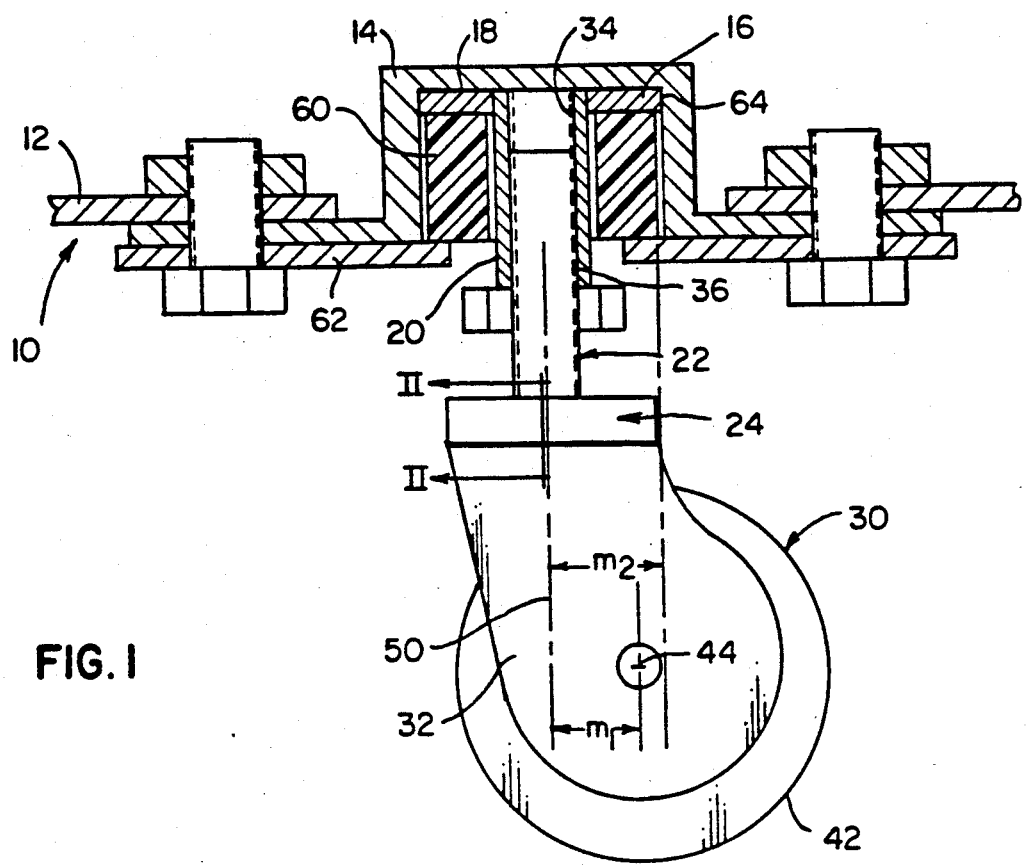
FIG. 1 is an elevational view partially in section of a caster constructed in accordance with the invention.

Referring to FIG. 1, instrument 10 is a heavy clinical analyzer having a variety of stations for dispensing biological liquids onto test elements that feed into an incubator and reading stations for detection, not shown. Any construction of the analyzer can be used, as this invention resides in the casters that allow the instrument to be moved along a horizontal surface. Useful examples are shown in EPA 56250. Such analyzers can weigh as much as 300 kilograms.

Instrument 10 has a bottom plate 12 with a housing plate 14 bolted thereto that is preferably hat-shaped. A generally flat load-bearing plate 16 is confined within plate 14 with surface 18 of plate 16 bearing against housing plate 14 over the entire surface 18. Extending from and secured to plate 16 (such as by welding) is a stud 20 that threadably engages connecting member 22 that is directly vertically coupled to frame 32 of caster 40 via a bearing 24, thereby ensuring a rigid vertical coupling of frame 32 to load-bearing plate 16. In this embodiment, stud 20 is internally threaded at 34 to receive the male threads 36 of member 22.

Figure 2:
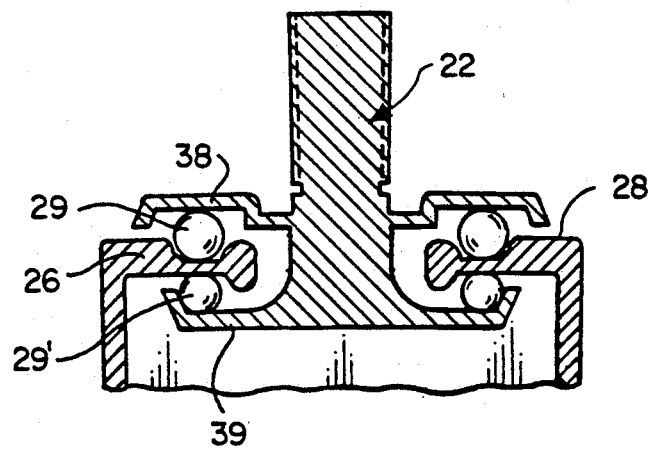
FIG. 2 is a section view taken generally along the line II—II of FIG. 1.

(As shown in FIG. 2, bearing 24 is conventional, comprising for example a race 26 formed in top plate 28 of frame 32, with a double row of balls 29, 29' confined to race 26 by housing flanges 38, 39 welded to connecting member 22.)

Any conventional locking means can be used to lock member 22 at a particular vertical height relative to stud 20, for example a jam nut 40.

Frame 32 of caster 30 conventionally is journalled to a roller 42 at journal axis 44. Axis 44 is located at a moment arm $m_1$ from the axis 50 of connection member 22 (also of stud 20).

Figure 3:
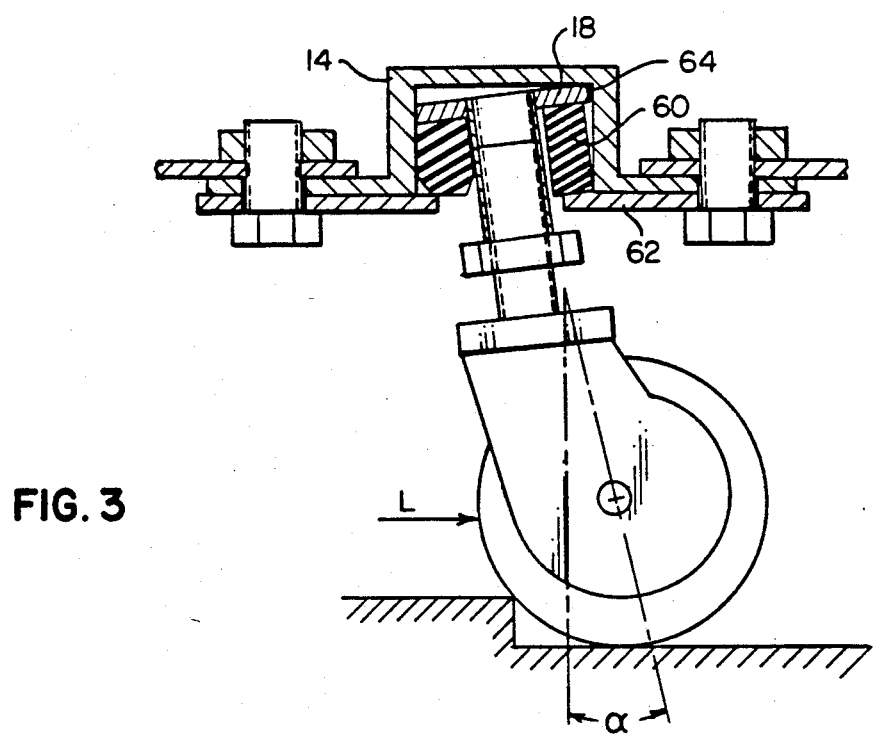
FIG. 3 is an elevational view similar to that of FIG. 1, showing the caster's behavior under a horizontal load.

Such a construction, by itself, gives rigidity to vertical loads on instrument 10. In addition, however, resiliency to horizontal loading is needed. To that end, an elastomeric damper 60 is mounted within housing plate 14 so as to surround stud 20, and to bear against plate 18. An exterior plate 62 is used to sandwich damper 60 into this position. The function of damper 60, FIG. 3, is to allow connecting member 22, and hence stud 20, to flex out of the vertical by an angle alpha, when encountering a horizontal loading force "L". That is, damper 60 is compressed on the side of the loading, as shown, with plate 18 pivoting about its exterior edge surface 64.

The resiliency of damper 60 is selected on the basis of the horizontal loading expected by instrument 10, as is well-known. For instrument 10 being a clinical analyzer weighing about 300 kilograms, it is preferred that damper 60 have approximately the following resiliency and hardness: 60-70 Shore A durometer hardness. Various rubber compounds provide this property.

In accordance with one aspect of the invention, plate 18 is provided with a sufficient horizontal, load-bearing extension, to edge 64, such that edge 64 provides a moment arm $m_2$, FIG. 1, that exceeds moment arm $m_1$. This is a crucial feature, since it minimizes any tendency of moment arm $m_1$ to preload damper 60 to the extent of creating a harmonic response to vertical oscillations of instrument 10. Most preferably, the amount at which $m_2$ is greater than $m_1$ is the amount which ensures that $m_2/m_1$ is at least 1.1/1.0.

Figure 4:
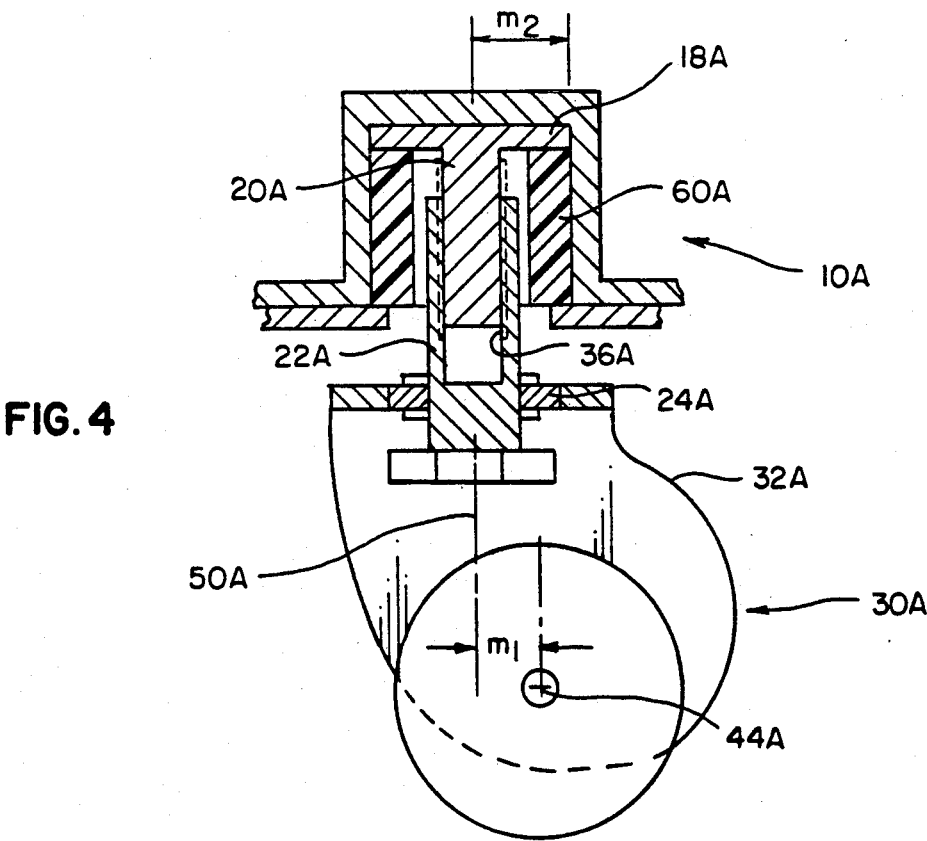
FIG. 4 is an elevational view similar to that of FIG. 1, but of an alternative embodiment.

It is not crucial that stud 20 be internally threaded to receive a male thread on member 22. As shown in FIG. 4, these parts can be reversed. Parts similar to those previously described bear the same reference numeral to which the distinguishing suffix "A"0 is appended.

Thus, instrument 10A moves on a caster 30A having a frame 32A pivotable via a bearing 24A fixed at a vertical location on a connecting member 22A that threadably engages stud 20A on plate 18A. Stud 20A is surrounded by damper 60A to give resiliency under horizontal loading, all as described before. In addition, moment arm $m_2$ of plate 18A exceeds moment arm $m_1$ created by journal axis 44A by its horizontal spacing from axis 50A. However, in this embodiment, stud 20A is externally threaded to receive female threads 36A of connecting member 22A.

The invention has been described in detail with particular reference to preferred embodiments thereof, but it will be understood that variations and modifications can be effected within the spirit and scope of the invention.

What is claimed is

1. A caster for a heavy instrument, said caster comprising a frame, means for pivotably connecting said frame to a resilient damper held by said instrument, and journal means for journalling a wheel on said frame off-center from said connecting means, said connecting means comprising a load-bearing plate and a stud fixed to said plate and having a rotational axis, said plate bearing directly over one of its surfaces onto a surface of said instrument, and said damper being disposed to surround said stud with said plate bearing on said damper, and said frame being fixedly secured to said stud in the vertical direction so as to deliver vertical forces directly onto said load-bearing plate with no vertical displacement of said frame relative to said instrument;

one surface of said plate extending horizontally to create a moment arm from said axis that is no longer than any horizontal moment arm created by said journal means from said axis, so that said stud can bend against said damper out of a vertical alignment and said plate can depress a portion of said damper when said wheel encounters only a horizontally-directed force 2. A caster as defined in claim 1, wherein said stud is internally threaded to receive an externally threaded rod pivotally connected to said frame.

3. A caster as defined in claim 1, wherein said stud is externally threaded to receive an internally threaded connecting member pivotally connected to said frame.

4. A caster as defined in claim 1, 2, or 3, wherein said longer moment arm of said plate exceeds said any horizontal moment arm of said journal means so that the ratio of said longer moment arm to said any moment arm is at least 1.1/1.0.

* * * * *

UNITED STATES PATENT AND TRADEMARK OFFICE
CERTIFICATE OF CORRECTION

PATENT NO. : 5,109,569
DATED : May 5, 1992
INVENTOR(S) : James D. Shaw

It is certified that error appears in the above-indentified patent and that said Letters Patent is hereby corrected as shown below:

Column 2, line 44, delete "56250" and insert --356250--.

Column 3, line 36, after "A", delete --0--.

Column 4, line 26 should read -- create a moment arm from said axis that is --.

Signed and Sealed this

Third Day of August, 1993

Attest:

MICHAEL K. KIRK

Attesting Officer     Acting Commissioner of Patents and Trademarks